April 29, 1952     B. R. HALPERN     2,594,920
VACUUM PRINTING FRAME
Filed July 9, 1949     2 SHEETS—SHEET 1
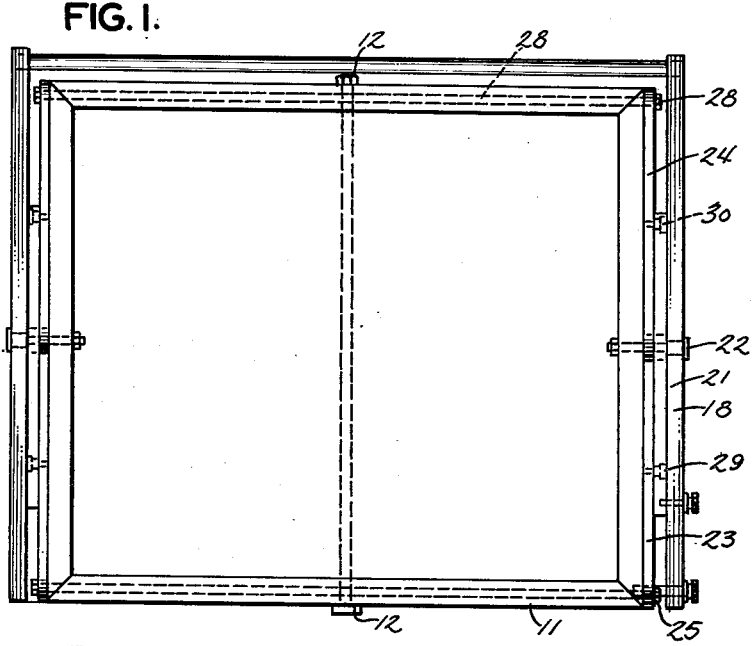
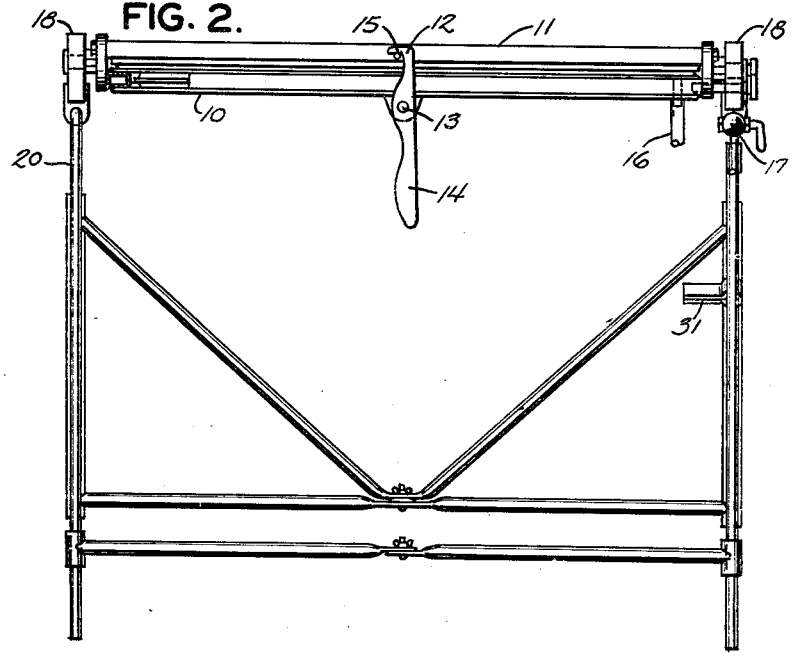
*INVENTOR.*
BERNARD R. HALPERN
BY
*ATTORNEY*

April 29, 1952   B. R. HALPERN   2,594,920
VACUUM PRINTING FRAME
Filed July 9, 1949   2 SHEETS—SHEET 2
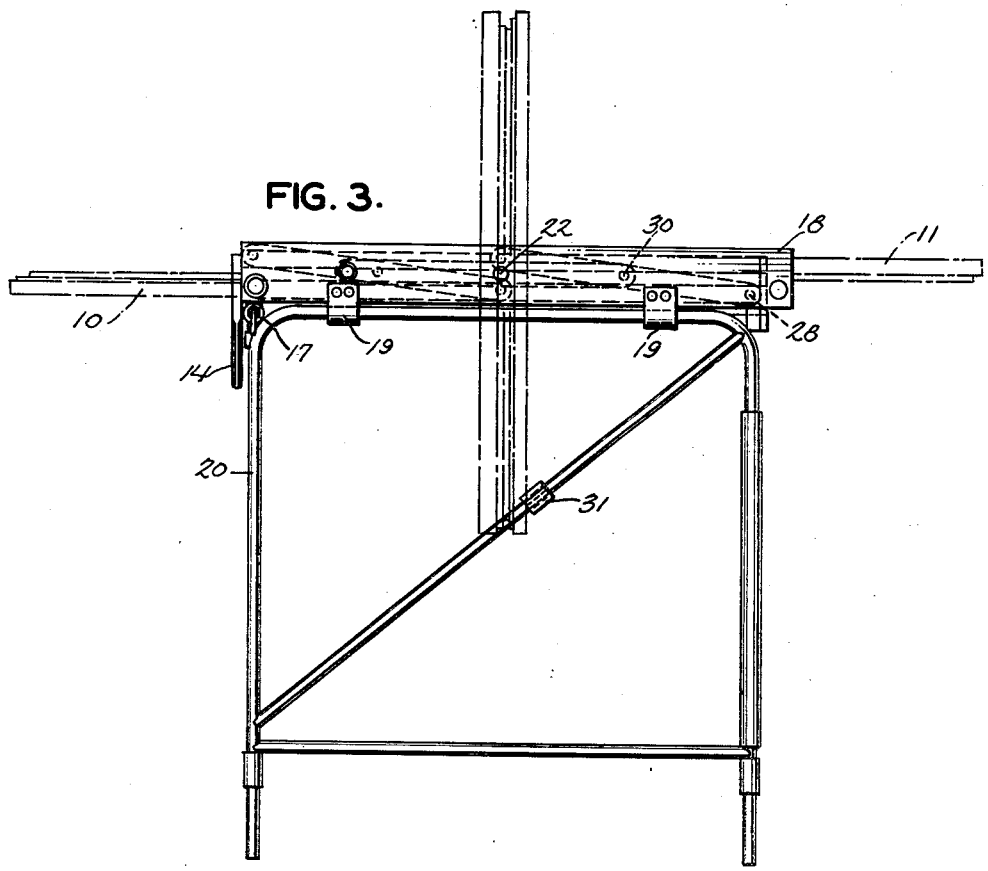
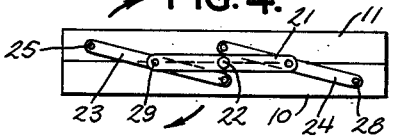
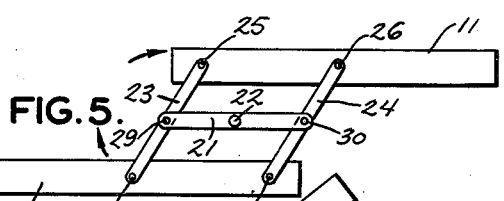
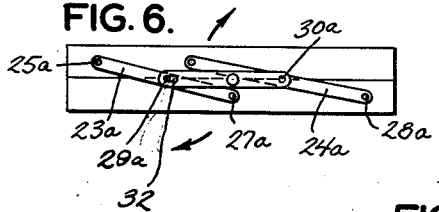
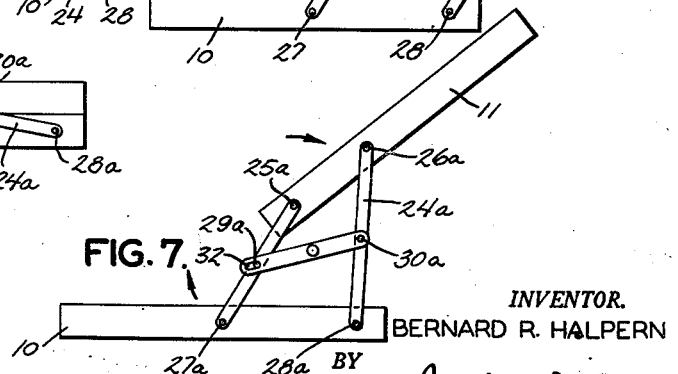
*INVENTOR.*
BERNARD R. HALPERN
BY
ATTORNEY Patented Apr. 29, 1952

2,594,920

UNITED STATES PATENT OFFICE 2,594,920

VACUUM PRINTING FRAME

Bernard R. Halpern, New York, N. Y., assignor to Zarkin Machine Co., Inc., Long Island City, N. Y., a corporation of New York Application July 9, 1949, Serial No. 103,919

3 Claims. (Cl. 95—76)

The invention herein disclosed relates to vacuum printing frames, and the main objects of the invention are to provide in a device of this character, a light but strong, rigid construction and one in which the two main parts, the glass and blanket frames, will counter-balance each other so as to avoid use of weight and spring counterbalance means.

Particularly it is a purpose of the invention to automatically counter-balance one frame by the other while in process of relatively opening and closing the frames and additionally, to provide for rotation and reversibility of the frames.

Special objects of the invention are to speed up the operations of opening and closing or relatively separating and approaching the glass and blanket frames, to enable full access to the working areas of the frames and to accomplish these and other purposes in a simple, practical, low cost construction.

Other desirable objects and the novel features through which the purposes of the invention are attained are set forth or will appear in the course of the following specification.

The drawings accompanying and forming part of the specification illustrate certain present commercial embodiments of the invention but structure may be further modified and changed as regards such illustration, all within the true intent and broad scope of the invention as hereinafter defined and claimed.

Fig. 1 in the drawings is a plan view of one of the vacuum frames;

Fig. 2 is a front elevation of the same with a portion of the lower, blanket frame indicated in section;

Fig. 3 is a side or end view of the machine showing in broken lines the opened or separated frames and also the two frames as rocked into a vertical position;

Figs. 4 and 5 are diagrammatic views illustrating the counter-balancing action of the two frames joined by parallel linkage;

Figs. 6 and 7 are similar views showing a modification in which the connecting links swing from a substantially parallel to a non-parallel relation, to lift the top frame into a more or less upright position over the lower frame.

In the several views the blanket and glass frames are designated 10 and 11.

They are secured together in closed relation by hooks 12 on the ends of a torque shaft 13 journaled beneath the lower, blanket frame and operated by a handle 14 to engage the hooks over lugs or pins 15 on the ends of the top, glass frame 11.

Suction is applied to the lower frame through a flexible hose 16 controlled by a valve 17, Fig. 2.

The two cooperating frames are separably and rotatably mounted in a base structure shown as made up of side bars or sills 18, secured by clamps 19 on the top of a tubular supporting frame 20.

The pivotal supports for the frames are shown as bars 21 pivoted intermediate their ends at 22, Figs. 1, 2 and 3, on the side bars 18 of the base structure, and the means for connecting the frames in counter-balancing relation is shown as comprising in the first instance, pairs of parallel links 23, 24, Figs. 4 and 5, at the opposite ends of the frames, pivotally connected at their upper ends at 25, 26, with the glass frame 11, and pivotally connected at their lower ends at 27, 28, with the blanket frame 10, said links being pivotally supported intermediate their ends at 29, 30, on the opposite ends of the pivoted arms 21.

The parallel linkage described is so connected that the frames 10 and 11 will shift from the superposed relation shown in Fig. 4, to the vertically and laterally separated relation shown in Fig. 5, in movement about the main pivotal axis 22 until they reach the fully separated, flat, horizontal relation indicated by the broken lines at the left and right in Fig. 3.

In all positions, in the course of such movement from immediately superposed to the fully separated position and from this back to the superposed relation, one frame will balance the other and enable an operator to quickly and easily shift them as desired.

Additionally, the two frames may be rotated bodily about the fixed supporting axis 22 into vertical position such as indicated in broken lines at the center in Fig. 3, either closed together or separated. Further, they may be completely reversed in such relation to bring the blanket frame to the top and the glass frame to the bottom.

If desired, however, an inwardly projecting stop such as indicated at 31, Figs. 2 and 3, may be provided on the supporting frame to prevent the frames from swinging in either direction beyond a substantially vertical position.

The parallel connecting linkage affords intimate, compact and close fitting engagement between the two frames and between the negative and printing plate elements, and this may be effected with a lighter construction than heretofore required. The frames are quickly and easily shifted from open to closed relation and vice versa, and they are as easily rotated on the main pivotal axis to bring either frame to the top or to the bottom or to locate the frames upright or in various inclined positions. While preferably one frame will substantially counter-balance the other, as a practical matter the upper, glass frame may slightly over-balance the lower, blanket frame so as to apply a normal tendency to hold the frames closed together.

The principle disclosed of an integral counterbalance system, free of connecting springs, weights or the like, may be modified in various ways. For example, the relative movement of the two frames may be eccentric, instead of concentric, by using connecting arms or links of different lengths so that in opening, one frame will assume an angular relation to the other frame.

Such a possibility is illustrated in Figs. 6 and 7, where one set of the connecting links 23a is made shorter than the companion set of connecting links 24a, so that in opening, the upper frame 11 will fulcrum about the upper pivot 25a of the shorter link, in addition to the lateral offsetting movement, so as to rise to more or less of an upstanding position when fully separated from the lower frame. By varying the relative lengths and arrangement of the shorter and longer links, various combinations of movements can be effected.

Also, in shifting from the inner, substantially parallel relation, Fig. 6, to the non-parallel relation shown in Fig. 7, some allowance must be made for this change between the pivot centers 29a, 30a, at the ends of the rotary supporting arms 21a. This is accomplished in the illustration by longitudinally slotting the ends of the arms 21a at 32 to slidingly accommodate the pivot pins 29a for the shorter links 23a.

Other variations in relative, non-parallel movements may be accomplished by having the opposite ends or arms of the pivoted supporting bars 21a of different length, substantially as indicated in Figs. 6 and 7.

The construction last described, where the relative movement of the frames in opening is shifted from parallel to non-parallel action, is of particular value where operating space is limited and there is not room enough to separate the frames to the full longitudinally offset relation illustrated in Fig. 3.

Since the bars operate substantially in balance, the supporting base structure may be relatively light, as indicated, enabling a large size printing frame to be made up light enough to be readily portable.

The entire structure, because of its simplicity and few parts, can be produced at relatively low cost.

As an aid to maintaining the frames in properly controlled relation at all times, the pivots at the ends of the frames, such as 25, 25a and 28, 28a, may be in the form of torque tubes extending through end portions of the frames and rigidly connected with the links 23, 23a and 24, 24a, at opposite ends of the same.

What is claimed is:

1. A self-balancing, reversible vacuum printing frame comprising a base structure, reversible supporting bars pivoted intermediate their ends in opposed, spaced relation, at opposite ends of said base structure, companion glass and blanket frames adapted and arranged one to substantially counter-balance the other, substantially parallel links pivotally mounted intermediate their ends on the opposite ends of said supporting bars and said links pivotally connected at their opposite ends with the companion glass and blanket frames, respectively, and whereby said glass and blanket frames may be separated in counter-balancing relation by rotative movement of said links on their intermediate pivots on the ends of the supporting bars and said frames may be reversed to bring either the glass or the blanket frame to the top by rotation of said supporting bars on their intermediate pivots on the base structure.

2. A self-balancing, reversible vacuum printing frame comprising a base structure, reversible supporting bars pivoted intermediate their ends in opposed, spaced relation, at opposite ends of said base structure, companion glass and blanket frames adapted and arranged one to substantially counter-balance the other, substantially parallel links pivotally mounted intermediate their ends on the opposite ends of said supporting bars and said links pivotally connected at their opposite ends with the companion glass and blanket frames, respectively, and whereby said glass and blanket frames may be separated in counter-balancing relation by rotative movement of said links on their intermediate pivots on the ends of the supporting bars and said frames may be reversed to bring either the glass or the blanket frame to the top by rotation of said supporting bars on their intermediate pivots on the base structure, and the links connecting opposite ends of said two frames being of substantially equal length and operating in parallel relation in the separation of the frames to thereby maintain said frames in substantially parallel relation in variously opened positions of the same.

3. A self-balancing, reversible vacuum printing frame comprising a base structure, reversible supporting bars pivoted intermediate their ends in opposed, spaced relation, at opposite ends of said base structure, companion glass and blanket frames adapted and arranged one to substantially counter-balance the other, substantially parallel links pivotally mounted intermediate their ends on the opposite ends of said supporting bars and said links pivotally connected at their opposite ends with the companion glass and blanket frames, respectively, and whereby said glass and blanket frames may be separated in counter-balancing relation by rotative movement of said links on their intermediate pivots on the ends of the supporting bars and said frames may be reversed to bring either the glass or the blanket frame to the top by rotation of said supporting bars on their intermediate pivots on the base structure, and the links at each end of the frames being of different length and thereby arranged to shift the frames from parallel to non-parallel relation in the separating movements of the frames.

BERNARD R. HALPERN.

REFERENCES CITED

The following references are of record in the file of this patent:

UNITED STATES PATENTS

| Number | Name | Date |
|---|---|---|
| 1,151,477 | Knudsen | Aug. 24, 1905 |
| 1,315,882 | Sweigard | Sept. 9, 1919 |
| 2,117,051 | Anderson | May 10, 1938 |
| 2,257,581 | Ulsheimer | Sept. 30, 1941 |

FOREIGN PATENTS

| Number | Country | Date |
|---|---|---|
| 433,635 | Germany | Sept. 9, 1926 |
| 468,190 | Germany | Nov. 7, 1928 |
| 519,593 | Germany | Mar. 9, 1931 |